Dec. 20, 1966  M. C. KEEHART ETAL  3,292,773
SUPPORT FOR CONVEYOR BELT
Filed March 12, 1965

INVENTORS.
Melvin C. Keehart
Robert L. Hubner
BY
Hovey, Schmidt, Johnson & Hovey
ATTORNEYS.

United States Patent Office 3,292,773
Patented Dec. 20, 1966

3,292,773
SUPPORT FOR CONVEYOR BELT
Melvin C. Keehart, Miami, and Robert L. Hubner, Marshall, Mo., assignors to Kee Conveyers, Inc., Miami, Mo., a corporation of Missouri
Filed Mar. 12, 1965, Ser. No. 439,260
9 Claims. (Cl. 198—204)

This invention relates to conveying mechanisms and, more particularly, to a support for a conveyor assembly adapted for carrying particulate material.

It is the primary object of this invention to provide a support for a conveyor belt whereby the belt is adapted for the carrying of particulate material, the belt assuming an arcuate configuration whereby a relatively large volume of material may be conveyed without any appreciable loss thereof, such as by vibrating or falling off the side of the belt. In general, conventional, flat conveyor belts are not suited for transferring particulate material, such as grain, because the fine particles will not stack to a sufficient height to allow transfer of any significant volume of the product. Also, the grain or material that is placed on the belt will often be vibrated toward the edges thereof and drop from the same to further lower the efficiency of the conveying process.

While the conveyor belt employed with our support may be an initially flat, continuous member constructed of flexible material, it is caused to assume the desired arcuate configuration as it is drawn across the support structure. The use of conventional flexible belts with the assembly obviates the necessity of manufacturing specially designed belts for carrying particulate material and thus the present invention is economically advantageous.

It is, therefore, an important object of the present invention to provide a conveyor belt support which is not only designed to carry a belt thereon in a specially configured manner, but which includes the additional provision of sidewalls adjacent the belt, whereby the particulate material is not allowed to escape the conveying process and hence optimum transfer of material is assured. The sidewalls are preferably constructed as an integral part of the assembly to facilitate their manufacture.

It is another object of the instant invention to provide a support for a conveyor belt as above described wherein the sidewalls include flanges thereon, the flanges and sidewalls both acting as supporting members to enhance the strength of the assembly. Preferably, the sidewalls and flanges are formed as an integral piece in conjunction with the portion of the assembly carrying the belt. Thus, the support may be easily and economically formed from a single sheet of material to produce the novel construction resulting in a high-strength assembly using a relatively small amount of material.

It is yet another object of this invention to provide a support for a conveyor belt wherein the support is adapted to receive a cover which overlies the conveyor belt and thereby forms a tunnel in conjunction with the sidewalls of the support to preclude escape of fine particles of the conveyed particulate material due to air currents or the like. In addition to the disadvantage of losing a portion of the conveyed material, dust of this type often becomes concentrated in critical proportions and creates an explosion hazard.

An aim of the present invention is to provide a support for a conveyor belt utilizing a cover of the above-mentioned character wherein the cover is configured to complementally engage the flange portions of the sidewalls to allow easy installation and removal thereof. In the preferred form, it is only necessary to place the cover into position and simply secure the same to the support by suitable spring clamps, there being no requirement for bolting or the like. The flanges extending from the sidewalls thus perform dual functions, i.e., bracing elements and cover-receiving means.

Another aim of our invention is to provide a conveyor belt support which is comprised of principal unitary sections, each section having joining means at the opposed ends thereof to allow connection to like sections to increase the effective length of the support assembly. Thus, the sections may be manufactured in a standard size and the user may obtain as many as necessary for his particular needs and operations.

Other objects include details of construction which will become apparent from the following specification and accompaying drawing, wherein.

Figure 1:
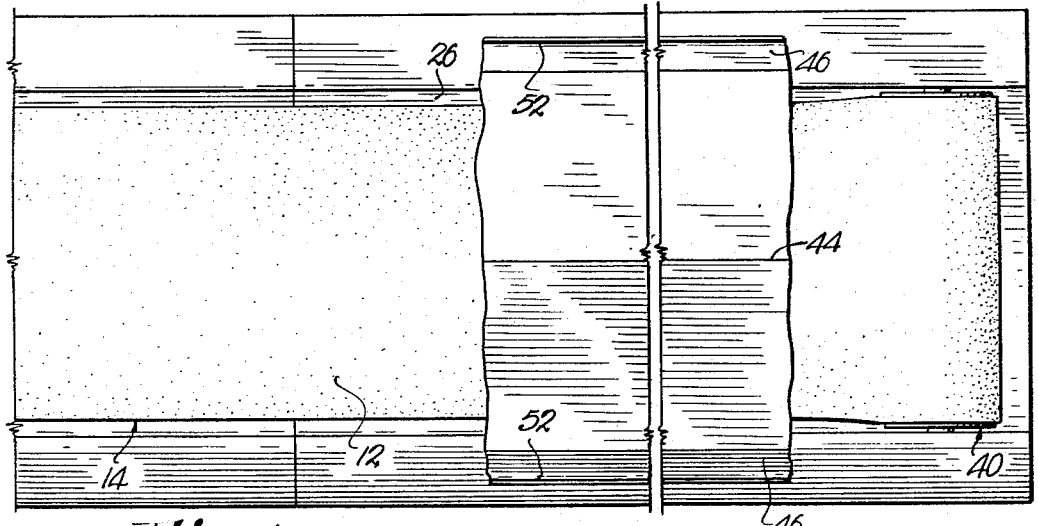
FIGURE 1 is a fragmentary, plan view of a conveyor belt support made pursuant to the teachings of our invention, parts being broken away for clearness.

The present invention broadly includes an elongated member 10 which is adapted for receiving a stretch 12 of a flexible conveyor belt 14, member 10 being disposed in an operating position by suitable supporting means 16. Member 10 is adapted to be connected in end-to-end relationship with identical members, and for purposes of illustration, member 10 is shown coupled to an adjacent member 10a.

Supporting means 16 includes a pan 18 disposed beneath member 10, which pan 18 has a bottom wall 20 and a pair of spaced-apart sidewalls 22. Each sidewall 22 is provided with an outwardly extending lip 24 at the upper edge thereof.

Member 10 is of a substantially U-shaped, transverse cross-sectional configuration whereby to present a bight 26 and a pair of spaced-apart legs or sidewalls 28. Legs 28 extend upwardly from bight 26 and are positioned in substantially the same vertical plane as the corresponding sidewalls 22 of pan 18. The lower edges of legs 28 are secured to supporting means 16, as by welding or the like, at the point of juncture between respective lips 24 and sidewalls 22. Bight 26 of member 10 is arcuate in transverse configuration to form a concave receiving surface for stretch 12 of conveyor belt 14.

One end 29 of the member, illustrated in the drawing as member 10a, is provided with a pair of elongated sleeves 30, each of the sleeves 30 having a substantially square, transverse cross-sectional configuration, and one face thereof being attached to a corresponding sidewall 22 of pan 18 in face-to-face relationship. Sleeves 30 are positioned slightly below lips 24 of pan 18, and one end thereof is in alignment with the end edge of said one end 29.

The other end 31 of the member, illustrated in the drawing as member 10, is provided with a pair of sleeves 33 which are identical with sleeves 30 and are attached to sidewalls 22 in the same manner as sleeves 30. It will be appreciated that each member 10 and 10a (and other members coupled in end-to-end alignment therewith) is provided with sleeves 30 and 33 at the opposed ends thereof.

Each sleeve 30 has a hollow projection 32 which is rigidly attached within sleeve 33 and extends outwardly therefrom. Projection 32 has a substantially square, transverse cross-sectional configuration which is adapted to complementally telescope within sleeves 33 of adjacent member 10. A plurality of setscrews 34 extend through the lower faces of sleeves 33 and are adapted to abut respective projections 32 to rigidly secure the latter in their operating telescoped positions.

A plurality of strips 36 span pan 18 between the opposed sidewalls 22 thereof at spaced intervals. Strips 36 are positioned for engaging the lower portion of the arcuate bight 26, whereby to add support thereto.

Figures 3, 4:
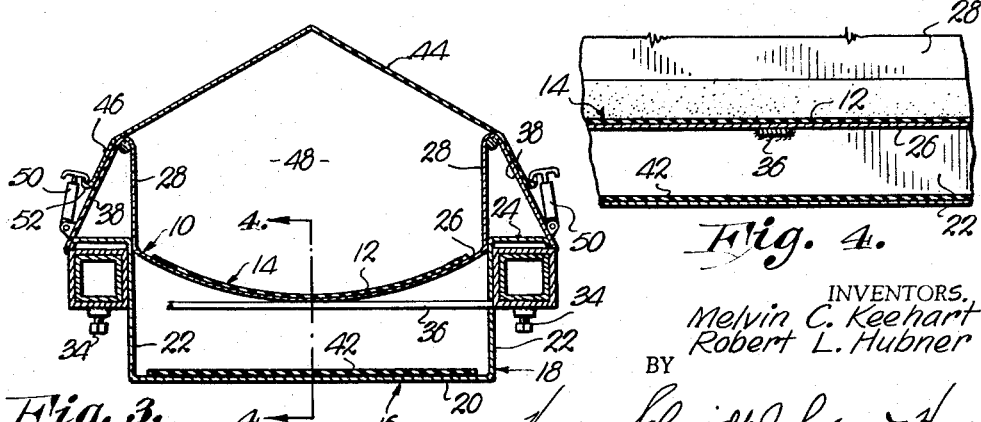
FIG. 3 is a cross-sectional view taken along line 3—3 of FIG. 2.
FIG. 4 is a cross-sectional view taken along line 4—4 of FIG. 3.

Each of the legs 28 is provided with a flange 38 which extends downwardly and outwardly from the uppermost edge thereof. Preferably, bight 26, legs 28 and flanges 38 are formed from an initially flat, elongated, single sheet of material and thus are integrally connected with each other as illustrated in FIG. 3. It will be appreciated that bight 26, legs 28 and flanges 38 may be easily manufactured by a simple stamping operation performed on the elongated flat sheet of material.

The outer free edges of flanges 38 are secured to the upper edges of proximal sleeves 30 and 33. Also, the outer free edges of lips 24 project downwardly and are secured to their corresponding flanges 38 and sleeves 30 or 33.

In use, a plurality of identical members are aligned in end-to-end relationship, such as the illustrated members 10 and 10a. The projections 32 at one end 29 of member 10a are telescoped into respective sleeves 33 at the other end 31 of member 10. Setscrews 34 are tightened against projections 32 to rigidly secure the same within respective sleeves 33. Additional members are added in a similar manner until the length of the conveyor belt support adequately meets the needs of the user.

Figure 2:
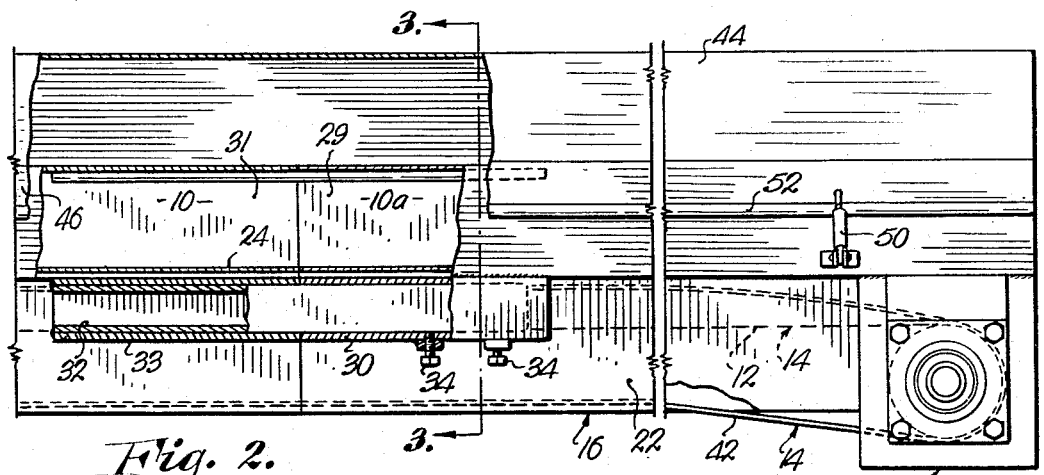
FIG. 2 is a fragmentary, side view thereof, parts being broken away and in section to reveal details of construction.

A pulley is positioned at each end of the conveyor belt support, one pulley 40 being illustrated in FIG. 2 at the free end of member 10. Conveyor belt 14 is of a continuous type and is trained around the opposed pulleys, the pulleys being provided with suitable driving mechanism. Pulleys 40 are vertically positioned so that the upper rotating surface thereof is at substantially the same height as the lowermost surface of arcuate bight 26. Thus, when conveyor belt 14 is trained around pulleys 40, one stretch 12 thereof is received by the upper surface of bight 26, while the return stretch 42 thereof is moved along the inner surface of bottom wall 20 of pan 18. Since conveyor belt 14 is constructed of a flexible material, stretch 12 thereof will assume the arcuate configuration of bight 26 as stretch 12 is continuously moved therealong. As stretch 12 encounters a pulley 40, it assumes its initially flat configuration and becomes return stretch 42 for movement beneath bight 26. Pulleys 40 are vertically positioned to assure that the lowermost portion of stretch 12 is not carried above the lowermost portion of the inner surface of bight 26.

Since stretch 12 of conveyor belt 14 assumes an arcuate configuration, particulate material may be placed thereon in relatively large quantities for conveying operations. The particulate material may be stacked from the lowermost portions of stretch 12 to the upper edges thereof without any attendant problems, such as the possibility of the material dropping from the edges of the conveyor belt. Conventional flat conveyor belts do not protect against such loss and hence, are inefficient for conveyance of particulate material.

If material is stacked higher than the upper edges of streach 12 and subsequently drops from the side of stretch 12 onto bight 26, the material will be prevented from falling to the ground or floor due to the provision of upwardly extending legs 28 and hence such material may easily be recovered from the support assembly. In conventional conveying apparatus, the particulate material is allowed to drop to the floor or ground and then must be inconveniently recovered or wastefully discarded.

An optional cover 44 may be provided, which cover 44 has an inverted V-shaped, transverse cross-sectional configuration, the edge portions 46 thereof being adapted to complementally engage flanges 38. Cover 44 extends longitudinally of member 10 in overlying relationship to bight 26 and thus forms a generally tubular tunnel 48 through which stretch 12 of conveyor belt 14 and the particulate material carried thereby may be moved.

Cover 44 may be manufactured in sections equal in length to member 10 or may be a single, continuous structure to facilitate installation and removal thereof. A plurality of fastening means 50 may be provided for securing edge portions 46 in face-to-face relationship with flanges 38. Edge portions 46 are provided with hooks 52 for interlocking with fastening means 50.

When particulate materials are being conveyed, fine particles thereof will often be carried by air currents into the surrounding area which may result in a critical concentration of the fine particles to create an explosion hazard. Tunnel 48 precludes such escape by physically impending any movement of the particles to the surrounding area and also, by eliminating the presence of air currents.

The conveyor belt support may be adapted for heavy duty use by constructing sleeves 30 and 33 so that they extend throughout the longitudinal lengths of sidewalls 22. In this construction, the outer free edges of flanges 38 are secured throughout the length thereof to their corresponding sleeves as are the outer free edges of lips 24 of pan 18. The complete securement of flanges 38 and lips 24 results in optimum bracing of the support assembly and thus adapts the same for heavy duty operations.

Thus, there is provided a conveyor belt support which will receive and adapt a flexible conveyor belt for efficiently carrying a large volume of particulate material which support can be conveniently constructed from a single, initially flat sheet of material which results in high-strength properties with only a minimal requirement of material. The member is adapted for coupling with identical members to easily increase the effective length of the conveying apparatus whereby the requirements of the user are effectively met.

Having thus described the invention, what is claimed as new and desired to be secured by Letters Patent is:

1. A support for a conveyor belt comprising:
   an elongated member having a substantially U-shaped, transverse, cross-sectional configuration whereby to present a bight and a pair of legs, the bight being arcuate and adapted for receiving a stretch of a conveyor belt thereon, the legs extending upwardly from said bight to form opposed sidewalls adajcent said stretch of conveyor belt;
   means supporting said member; and
   a flange on each of said legs extending downwardly and outwardly therefrom, each of said flanges being substantially coextensive in height with its corresponding leg and having its outer free edge secured to said supporting means.

2. The invention of claim 1, there being a cover carried by said member, said cover extending longitudinally thereof and overlying said bight whereby to present a generally tubular tunnel for said stretch of said conveyor belt to travel through.

3. A support for a conveyor belt comprising:
   an elongated member having a substantially U-shaped, transverse cross-sectional configuration whereby to present a bight and a pair of spaced-apart legs, the bight being concave and receiving a stretch of said belt, the legs being substantially vertical and extending upwardly from said bight;
   a flange extending outwardly and downwardly from the upper edge of each of said legs, each flange being substantially coextensive in height with its corresponding leg; and
   means supporting said member.

4. The invention of claim 3, there being a cover for said member, said cover extending longitudinally of said member and having portions thereof in complemental engaging relationship with said flanges whereby to position said cover in overlying relationship to said member.

5. The invention of claim 4, there being fastening means for securing said cover to said flanges.

6. The invention of claim 3, said supporting means including a pan disposed beneath said member, said pan having a bottom wall and a pair of spaced-apart sidewalls, the bottom wall being beneath said bight, the sidewalls being in substantially the same vertical plane as said legs; and a lip extending outwardly from the normally upper edge of each of said sidewalls, said flanges being secured to corresponding lips.

7. The invention of claim 6, the pan being secured to the member at the point of juncture between said lips and said sidewalls.

8. The invention of claim 7, there being a plurality of strips secured to the sidewalls of said pan, spanning the pan and engaging the bight of the member, said strips being at spaced intervals throughout the length of the pan.

9. The invention of claim 8, there being a sleeve carried by each of the sidewalls of the pan at one end thereof, the outer free edge of each of said lips being secured to a corresponding sleeve, the outer free edge of each of said flanges being secured to a corresponding sleeve.

References Cited by the Examiner

UNITED STATES PATENTS

| Re. 17,782 | 8/1930 | Eckardt et al. | 198—204 |
| 756,600 | 4/1904 | Dodge | 198—108 |
| 2,147,908 | 2/1939 | Madeira | 198—204 |
| 2,149,158 | 2/1939 | Bergmann | 198—204 |
| 2,685,955 | 8/1954 | Kinney et al. | 198—191 |
| 2,718,296 | 9/1955 | Johnson | 198—204 |
| 2,842,256 | 7/1958 | Reed | 198—204 |
| 2,921,670 | 1/1960 | Albers | 198—204 |
| 3,212,628 | 10/1965 | Massey et al. | 198—204 |

EVON C. BLUNK, *Primary Examiner.*

M. L. AJEMAN, *Assistant Examiner.*